US 6,677,065 B2

(12) United States Patent
Blauer (10) Patent No.: US 6,677,065 B2
(45) Date of Patent: Jan. 13, 2004

(54) PAD PRINTING OF RECESSED SURFACES FOR AUTOMOBILE EMBLEMS

(75) Inventor: Darrell W. Blauer, Orono, MN (US)

(73) Assignee: Douglas Corporation, Eden Prairie, MN (US)

( * ) Notice: Subject to any disclaimer, the term of this patent is extended or adjusted under 35 U.S.C. 154(b) by 0 days.

(21) Appl. No.: 10/289,535

(22) Filed: Nov. 6, 2002

(65) Prior Publication Data

US 2003/0087047 A1 May 8, 2003

Related U.S. Application Data

(60) Provisional application No. 60/337,826, filed on Nov. 8, 2001.

(51) Int. Cl.$^7$ ................................................. A44C 3/00
(52) U.S. Cl. ......................... 428/913.3; 428/31; 40/1.5
(58) Field of Search ............................. 428/31, 542.2, 428/542.4, 543, 913.3; 63/20; 40/1.5

(56) References Cited

U.S. PATENT DOCUMENTS

| 3,895,987 A | 7/1975 | Loreck |
| 4,019,436 A | 4/1977 | Handweiler et al. |
| 4,508,032 A | 4/1985 | Philipp |
| 4,597,146 A * | 7/1986 | Larin ..................... 29/896.41 |
| 4,745,857 A | 5/1988 | Putnam et al. |
| 5,054,390 A | 10/1991 | Birtles et al. |
| 5,806,957 A | 9/1998 | Prior et al. |
| 6,036,326 A | 3/2000 | Yoshikawa et al. |
| 6,244,172 B1 | 6/2001 | Holmberg et al. |

* cited by examiner

Primary Examiner—Deborah Jones
Assistant Examiner—Arden Sperty
(74) Attorney, Agent, or Firm—Dorsey & Whitney LLP (57) ABSTRACT

Pad printing techniques are used to print into recesses to provide high quality, visually distinctive decorative items, including automobile emblems with a recess. To facilitate the pad printing, the recess is provided with angled sidewalls and an arcuate transition. This combination allows the pad to wet the entire printable surface without forming air gaps that would hinder the pad printing process. A rounded shoulder is provided around the recess and the rounded should is free from ink. The rounded shoulder provides a highly visible boundary that reflects light when viewed from different angles.

3 Claims, 11 Drawing Sheets

PAD PRINTING OF RECESSED SURFACES FOR AUTOMOBILE EMBLEMS

CROSS-REFERENCE TO RELATED APPLICATION

This application claims priority from a U.S. provisional patent application Ser. No. 60/337,826, filed on Nov. 8, 2001, which is herein incorporated by reference in its entirety.

BACKGROUND

Graphic indicia, including such items as nameplates, descriptors, appliques, emblems etc., are used to decorate, enhance appearance, identify or describe many articles. The present invention relates to such graphic indicia, methods of its use and methods of making such indicia.

More particularly, the present invention relates to automobile emblems, products for industry, and methods for making the same, wherein the methods include printing surfaces of emblems.

Decorative automobile emblems are used to identify and distinguish most makes and models of automobiles today. Such emblems are often used to identify a manufacturer, a line of vehicles, or a particular style or version. The quality of an emblem used on a lower end vehicle may often be lower than the quality for a higher end vehicle, in terms of the materials used, the design, the tolerances, and the subjective visual appearance.

As is often the case, the traditional manufacturing techniques offer a trade-off between perceived quality and cost. The current benchmark or standard for classic high-end, high quality automobile emblems are those made with a Cloisonné process. This process utilizes a hobbed, cast bronze, or other soft metal component. A channel or recess is then formed into the component and glass frit is added to the channel or recess. The component and the glass are then heated until the glass melts. The component is then buffed so that the layer of glass is polished, even with the remainder of the components, smooth, and visually appealing. Sometimes chrome or another material is electroplated (or otherwise applied) to the remaining portion of the component, while leaving the glass exposed. This tends to raise the height of the chromed portion above the glass, providing a visually distinctive transition.

When properly done, the Cloisonné process produces aesthetically pleasing, highly decorative emblems. However, the process is time consuming, very labor intensive, and extremely expensive. Such expensive emblems usually only appear on more expensive vehicles. In addition, because soft metal is so often used, the emblems are somewhat flexible. While this generally does not affect the metal portions, flexing the emblem tends to fracture the glass which often ruins the visual appearance. As such, careful manual application is required during assembly and, even then, attachment of the emblem to the vehicle may often result in damage so that increased labor costs result.

For more common emblems, a blank or a workpiece is produced by any suitable process such as casting or injection molding. The blanks could be formed from any suitable material, including plastic or metal. A pattern is defined that may include various recessed portions having vertical sidewalls. The blank is masked so that only the desired pattern is exposed and the blank is then spray painted to achieve a final product. The near-vertical sidewalls are required so that the mask can engage the recess and prevent errant spraying.

While producing acceptable results, spray painted emblems are generally considered to be less visually appealing than emblems produced by the Cloisonné process. Even spray painting emblems is fairly labor intensive in that each blank must be aligned with the mask; however, the final cost of the emblem is much less than those produced with the Cloisonné process, thus providing one advantage.

With cost often being the deciding factor, and bolstered by the physical difficulties in using the softer Cloisonné emblems, spray painted emblems are more frequently utilized by automobile manufactures for most vehicles lines. Still, manufactures would prefer to use and discerning consumer would prefer to receive more visually appealing and higher quality emblems, if the price could be reduced.

With most of the emblems being produced with the spray painting process, other significant environmental concerns materialize. As with most spray painting operations, overspray is produced which, in combination with evaporation and other mechanisms results in the introduction of large amounts of VOC's (volatile organic compounds) into the environment. For example, in producing just one automobile manufacturer's signatory identifying emblem (for most of that manufacturer's vehicles), the emblem manufacturer estimates that some 1500 pounds of VOC's are released into the environment per month.

Conventional paints are often a mixture of components that have their own level of toxicity. Many of the components contain VOC's, which are often responsible for the strong chemical odor of fresh paint. When exposed to high concentrations of VOC's, they may be harmful to humans. For example, breathing vapors with VOC's may lead to respiratory problems, headaches and even cancer.

One common source of VOC's in paint comes from solvents which are used to keep paint in liquid form. The VOC's in solvents are primarily released by evaporation as the paint dries. Another source of VOC's comes from binders. Binders are resins and oils that harden the paint. Acrylic is the binder found in the latex water-based paints while oil-based paints usually contain alkyd resin as a binder. Latex paints also contain styrene butadiene, and polyvinyl acetate.

The pigments sometimes used in commercial paints may be another source of toxins, often in the form of toxic heavy metals. Paints also contain a multitude of additives like dryers, thickeners, preservatives, anti-fungals, and mildewcides—all of which are known to be extremely toxic.

Thus, the continued use of spray painting to produce mass quantities of components for objects as plentiful as automobiles would require the introduction of significant volumes of VOC's into the environment. As a result, there may be a negative environmental impact and in addition, the potential exists for causing harm to humans.

Thus, there exists a need to produce high quality automobile emblems having a high visual and aesthetic quality at a reduced cost while simultaneously reducing the emissions of VOC's into the environment.

SUMMARY

In one embodiment, the present invention utilizes pad printing to print patterns on decorative items.

In one embodiment, the present invention comprises pad printing recessed portions of automobile emblems. The pad printing technique produces deep, rich color patterns with precise, realistic patterning that results in a visually striking presentation. The process allows for multi-color printing to further enhance the resulting printed image. The finished product is as visually appealing, if not more so, than products produced with the Cloisonné process. Furthermore, the patterning achieved with the present invention cannot be produced using the Cloisonné process or masking and spray painting. Pad printing is cost effective and can be fully automated, thus resulting in tremendous manufacturing advantages because the costs of producing a high quality, visually striking automobile emblem are greatly reduced compared with using known techniques, such as Cloisonné. Furthermore, because various types of emblems can be manufactured from many different types and kinds of materials, the products and processes of the present invention are not limited to soft metals and, furthermore, do not suffer from the same damage when a resulting product is flexed.

The pad printing process is also significantly less harmful to the environment than spray painting. That is, the process greatly reduces the volume of VOC's that are introduced. For example, by replacing spray painting with pad printing, one manufacture can reduce the amount of VOC's being introduced by 91%.

In one embodiment, the pad printing process of the present invention uses a silicone transfer pad to receive an ink pattern and to the press that pattern against a workpiece so that the ink is transferred to the workpiece. In some embodiments, the ink pattern is transferred into a recess located on the workpiece wherein the sidewalls of the recess are not vertical or perpendicular with respect to the workpiece. If the workpiece had vertical sidewalls, the pad would form air gaps or pockets as it pressed into the recess. Thus, the present invention involves specifically configured recess sidewalls and radiused transitions that allow the pad to fully wet the desired portion of the recess, without producing air gaps or pockets that would otherwise lead to sub-standard printing.

In some embodiments, the recess also includes a rounded shoulder portion that is not printed with ink. The shoulder portion may be coated with a reflective material such as chrome. The shoulder portion serves to further visually define the printed area by providing a highly visible boundary. That is, the rounded shoulder will reflect light along a linear pattern when viewed from different angles. This provides a unique sparkle to the product and defines or at least partially borders the printed regions.

In one embodiment, the product of the present invention is an emblem for attachment to a vehicle. The emblem includes a first surface configured for attachment to a body of a vehicle; a second surface opposite the first surface; a boundary surface forming a portion of the second surface; and a recess within the second surface and bordered by the boundary surface. The emblem also includes a generally planar recess floor configured to receive printable ink; a first sidewall interconnecting the generally planar recess floor and a first portion of the boundary surface, wherein the first sidewall is disposed at a non-orthogonal angle with respect to the generally planar recess floor and the non-orthogonal angle is between about 0 degrees and about 85 degrees as measured from a plane orthogonal to the generally planar recess floor and extending from the generally planar recess floor towards the plane defined by the boundary surface to the first sidewall; and a second sidewall interconnecting the generally planar recess floor and a second portion of the boundary surface, wherein the second sidewall is disposed at a non-orthogonal angle with respect to the generally planar recess floor and the non-orthogonal angle is between about 0 degrees and about 85 degrees as measured from a plane orthogonal to the generally planar recess floor and extending from the generally planar recess floor towards the plane defined by the boundary surface to the second sidewall, wherein the recess has a depth defined between the plane generally defined by the boundary surface and the generally planar recess floor, wherein the depth is between about 0.0005 inches and about 0.050 inches.

In one embodiment, the emblem further includes a first floor-sidewall transition interconnecting the generally planar recess floor with the first sidewall, wherein the first floor-sidewall transition is an arcuate corner formed by an arc segment having a radius of between about 0.003 inches and about 0.6 inches; a second floor-sidewall transition interconnecting the generally planar recess floor with the second sidewall, wherein the second floor-sidewall transition is an arcuate corner formed by an arc segment having a radius of between about 0.003 inches and about 0.6 inches.

In one embodiment, the emblem has a first convex rounded corner interconnecting the first sidewall with the first portion of the boundary surface, wherein the first convex rounded corner is formed by an arc segment having a radius of between about 0.003 inches and about 0.6 inches; a second convex rounded corner interconnecting the second sidewall with the second portion of the boundary surface, wherein the second convex rounded corner is formed by an arc segment having a radius of between about 0.003 inches and about 0.6 inches; and an ink layer disposed on the generally planar recess floor so that substantially the entire generally planar recess floor is covered by the ink layer and the ink layer terminates on a first edge between the first floor-sidewall transition and the first convex rounded corner so that the first convex rounded corner is devoid of ink and on a second edge between the second floor-sidewall transition and the second convex rounded corners so that the second convex rounded corner is devoid of ink, wherein the ink layer is pad printing ink applied during a pad printing process. The emblem also has a reflective surface forming at least a portion of the boundary surface, the first convex rounded corner and the second convex rounded corner.

In another embodiment, the present invention is a method of making an automobile emblem. The method comprises providing a workpiece. The workpiece includes a first surface configured for attachment to a body of a vehicle; a second surface opposite the first surface; a boundary surface forming a portion of the second surface; and a recess within the second surface, bordered by the boundary surface. The workpiece also has a generally planar recess floor configured to receive printable ink; a first sidewall interconnecting the generally planar recess floor and a first portion of the boundary surface, wherein the first sidewall is disposed at a non-orthogonal angle with respect to the generally planar recess floor and the non-orthogonal angle is between about 0 degrees and about 85 degrees as measured from a plane orthogonal to the generally planar recess floor and extending from the generally planar recess floor towards the plane defined by the boundary surface to the first sidewall; and a second sidewall interconnecting the generally planar recess floor and a second portion of the boundary surface, wherein the second sidewall is disposed at a non-orthogonal angle with respect to the generally planar recess floor and the non-orthogonal angle is between about 0 degrees and about 85 degrees as measured from a plane orthogonal to the generally planar recess floor and extending from the generally planar recess floor towards the plane defined by the boundary surface to the second sidewall, wherein the recess has a depth defined between the plane generally defined by the boundary surface and the generally planar recess floor, wherein the depth is between about 0.0005 inches and about 0.050 inches.

The workpiece further includes a first floor-sidewall transition interconnecting the generally planar recess floor with the first sidewall, wherein the first floor-sidewall transition is an arcuate corner formed by an arc segment having a radius of between about 0.003 inches and about 0.6 inches; a second floor-sidewall transition interconnecting the generally planar recess floor with the second sidewall, wherein the second floor-sidewall transition is an arcuate corner formed by an arc segment having a radius of between about 0.003 inches and about 0.6 inches.

The workpiece has a first convex rounded corner interconnecting the first sidewall with the first portion of the boundary surface, wherein the first convex rounded corner is formed by an arc segment having a radius of between about 0.003 inches and about 0.6 inches; and a second convex rounded corner interconnecting the second sidewall with the second portion of the boundary surface, wherein the second convex rounded corner is formed by an arc segment having a radius of between about 0.003 inches and about 0.6 inches.

The method further comprises placing the workpiece into a workpiece holder; depositing pad printing ink onto an etched cliché adjacent to the workpiece; passing a doctor blade across the etched cliché to disburse the ink to an etched portion; and positioning a silicone pad above the etched cliché. The method provides for pressing the silicone pad against the etched clichéd to transfer the ink from the etched cliché to the silicone pad; positioning the silicone pad above the workpiece; and pressing the silicon pad against the workpiece so that the ink transfers from the silicone pad to the workpiece, wherein the ink is applied to the generally planar recessed floor, a portion of the first sidewall, and a portion of the second sidewall so that at least the first and the second rounded corners remain devoid of ink.

DETAILED DESCRIPTION

Figure 1:
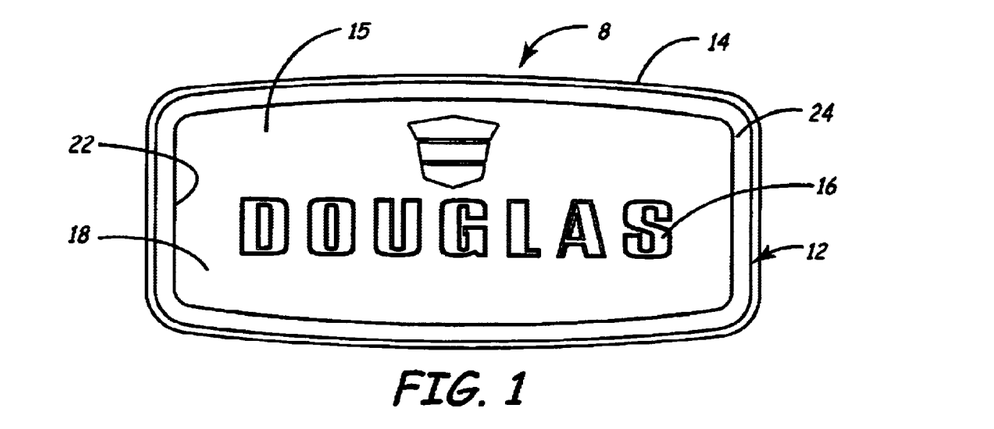
FIG. 1 is a planar view of a workpiece for forming an emblem consistent with the teachings of the present invention.
Figure 2:
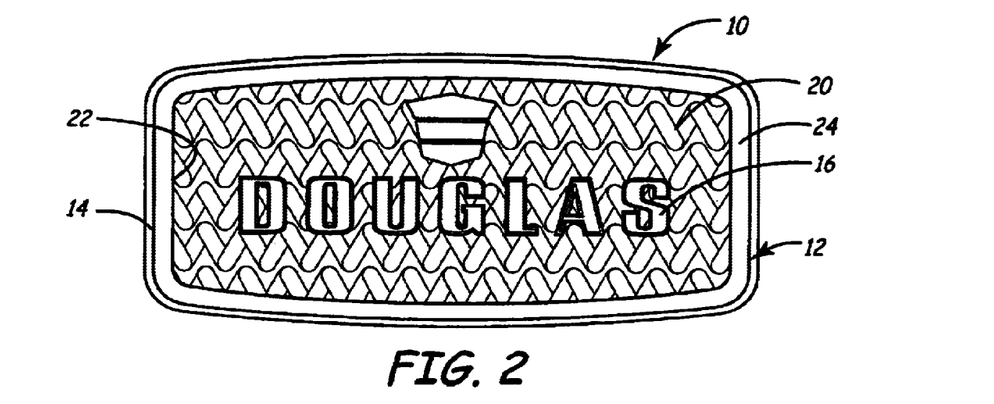
FIG. 2 is a planar view of an emblem having a printed pattern, consistent with the teachings of the present invention.
Figure 3:
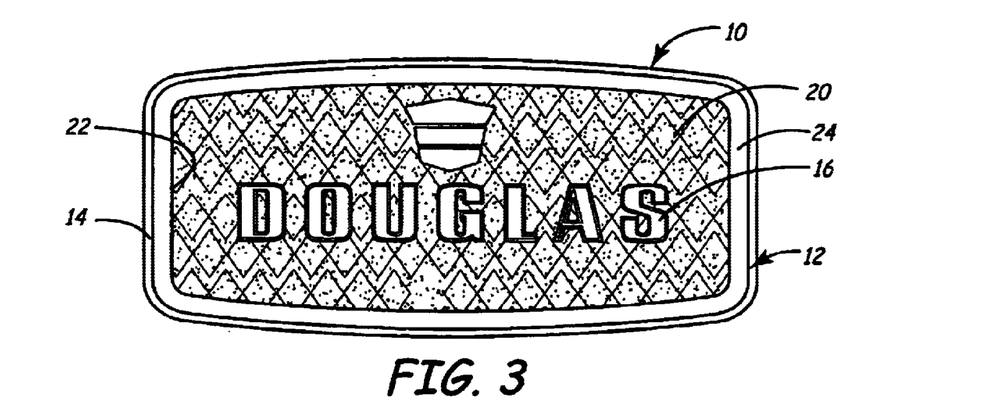
FIG. 3 is a planar view of an emblem having a printed pattern, consistent with the teachings of the present invention.

An automobile emblem workpiece 8 is illustrated in FIG. 1 and completed automobile emblems 10 are illustrated in FIGS. 2 and 3. The depicted workpiece 8 is representative of products of the present invention. The workpiece 8 includes a base portion 12 having an outer perimeter 14. The shape of the outer perimeter 14 can be chosen to take on virtually any configuration. Raised, identifying indicia 16 is optionally formed integrally with the base portion 12 and a recessed portion 18 exists between the outer perimeter 14 and the indicia 16. That is, the indicia 16 are raised with respect to the recessed portion 18. In this example, the recessed portion 18 defines a printable area 15, where an ink pattern, design, texture, indicia, or other inked material is added and referred to as printed area 20, as illustrated in FIGS. 2 and 3.

The base portion 12 is formed and the recess 18 is defined. The base portion 12 can be appropriately textured or colored, e.g., may have a chrome finish. Pad printing is utilized to apply ink to the recessed portion 18. The pad printing technique produces several advantageous features, especially when applied to a recessed area 18. For example, the sidewalls 22 are specifically configured to accommodate the pad printing process, as will be described more fully below. It should be appreciated that the term sidewall can apply to any portion bordering or defining a recessed area for printing. That is, a given recess may have raised structures (e.g., indicia 16) that act as a wall portion and will have the same attributes and effects as a bordering sidewall with respect to the pad printing process. As a result a curved convex shoulder 24 is provided as part of the sidewall 22 and remains free from any ink applied during the pad printing process. This produces a very visually distinctive transition from a printed area to a non-printed area. That is, the printed area 20 is set somewhat below (recessed) the outer perimeter 14 and the shoulder 24, thus there is a physical boundary defined. Furthermore, the curvature of the shoulder produces a reflection of light when viewed from most angles. Thus, the transition from the printed to the non-printed area is visually highlighted. This effect is most pronounced when the shoulder is formed from or coated with a highly reflective material, such as chrome.

Another advantage produced by the pad printing technique is that the printed area 20 may include, deep rich colors generally only available from the Cloisonné process. That is, the pad printing technique allows for the use of high quality colored printing inks to achieve high levels of color depth and richness. The pad printing process provides for a smooth, continuous, and very even application of the ink, further increasing the visual appearance of the printed surface 20.

The pad printing process also provides the ability to print multiple layers allowing for the creation of patterns and simulated textures. Thus, multicolor patterns, images and indicia can be created. In this regard, the pad printing process produces even better results than the Cloisonné process, which is limited by the necessity to apply glass frit. In addition, these results are significantly better than using a spray painting technique that only allows for the application of solid colors. FIGS. 2 and 3 illustrate similar emblems 10 with different exemplary patterns printed within the recesses portions 18. Virtually any pattern that can be visually defined (e.g., marble) can be created with the pad printing process through a color separation technique. The result is visually stunning, sharp, detailed patterns and simulated textures.

Thus, the present invention utilizes pad printing to produce high quality patterns and colors on automobile emblems at a reduced cost, with the end result actually exceeding the previous benchmark standard in the industry.

In FIGS. 1–3, the emblem 10 has indicia 16 defined by a raised portion, and the printing produces a background field around that indicia. Alternatively, pad printing into recesses can be used to highlight or generate indicia or other smaller features within an emblem. For example, emblem 30 illustrated in FIGS. 4A, 4B and 5 includes scripted indicia 32 having an integral recess 34, with the recess having a printed portion 36, formed from pad printing.

Figures 4, 4A:
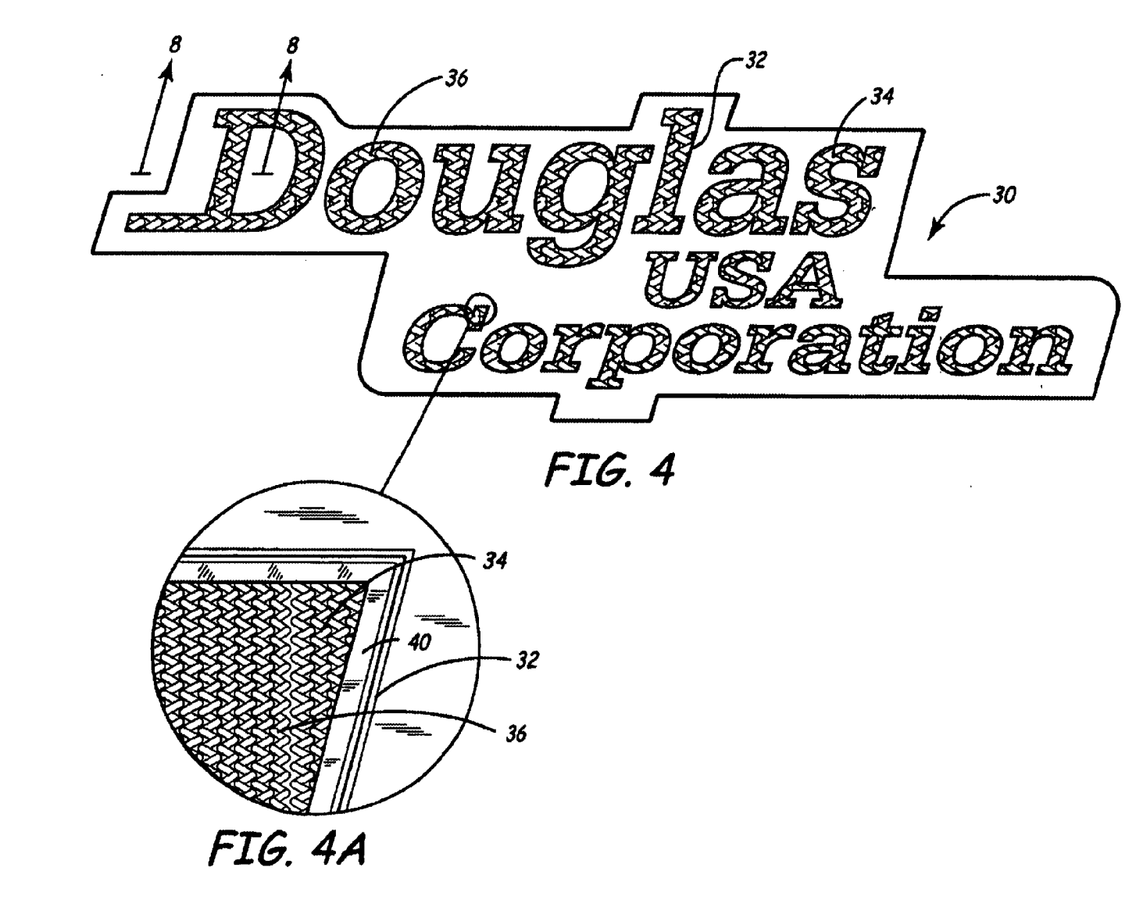
FIG. 4 is a planar view of an emblem having a printed pattern, consistent with the teachings of the present invention.
FIG. 4A is a planar view of an enlarged portion of the emblem of FIG. 4 illustrating a rounded shoulder adjacent to a printed recessed surface.
Figure 5:
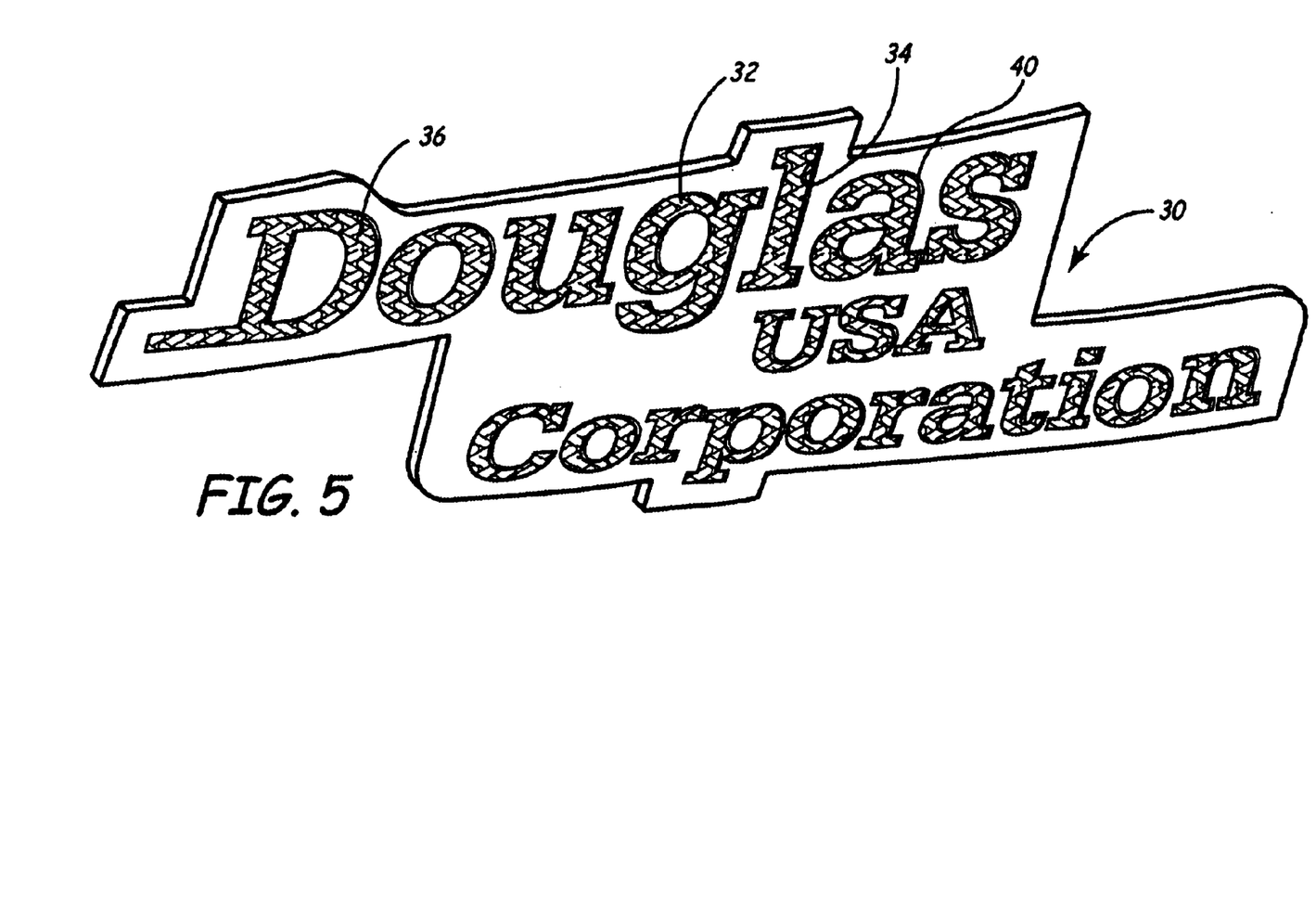
FIG. 5 is an isometric view of the emblem of FIG. 4.

FIG. 4A illustrates how the rounded shoulder 40 helps to define the boundary between the raised portion of the indicia 32 and the printed portion 36. Rounded shoulder 40 may be coated with a reflective material, such as chrome to further visually define the boundary. As the printed portion 36 is set below or deeper than the lowermost point of curvature for the shoulder 40, there is also a distinct physical transition or boundary created. These two features in combination serve to accent the printed portion 36 and draw visual attention to it. That is, regardless of the angle the emblem 30 is viewed at, some linearly consistent portion of the rounded shoulder 40 will reflect light producing a dazzling, shimmering boundary.

FIGS. 6A–6E and 14 illustrate the pad printing process. In general, pad transfer printing utilizes an inked image that is lifted from the engraved area of an engraved printing plate and is transferred to a surface to be printed by a resilient ink transfer pad, normally made of silicone rubber. The surface characteristics of the silicone rubber are such that the ink easily releases from the pad and adheres to the print receiving surface. The transfer pad typically can elastically deform during printing so that many types of surfaces, including some raised and some irregular shaped surfaces can be printed, in addition to flat surfaces.

Figure 6A:
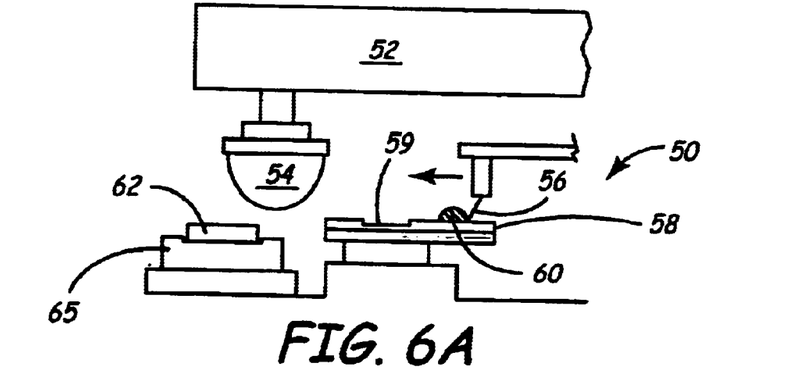
FIGS. 6A–6E are schematic illustrations showing a pad printing process.
Figure 6B:
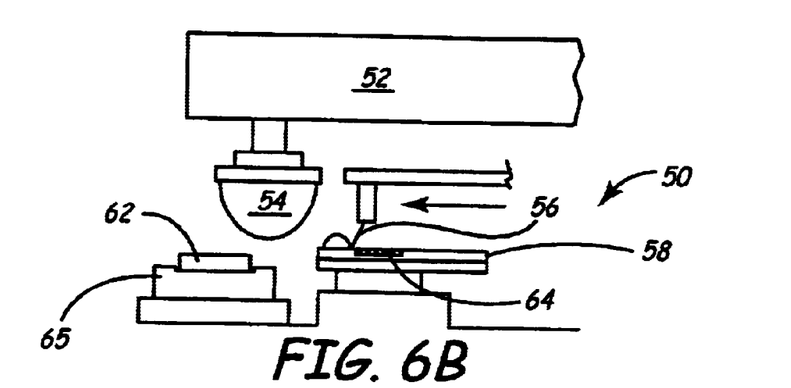

A workpiece 62 (e.g., blank 8 of FIG. 1) is provided (S300) and placed (S310) into a workpiece holder 65. This can be done manually or as part of an automated process. Generally, the workpiece holder 65 is specifically adapted or configured to receive the workpiece 62 so that the workpiece 62 is precisely spatially oriented and positioned. An etched cliché 58 is positioned adjacent to the workpiece holder 65. The etched cliché 58 is a smooth surface (generally metal) having a patterned recessed portion 59 that is essentially an appropriate image of the desired printed image. That is, to accommodate some printing surfaces (e.g., curved), the image may be pre-distorted to allow the resulting image to appear correctly on that surface. Ink 60 is deposited (S320) on an upper surface of the etched cliché 58 and a doctor blade 56 moves (S330) across the upper surface. This removes the ink 60 from the upper surface and deposits a portion of the ink 64 into the patterned recessed portion 59, as illustrated in FIG. 6B.

Figure 6C:
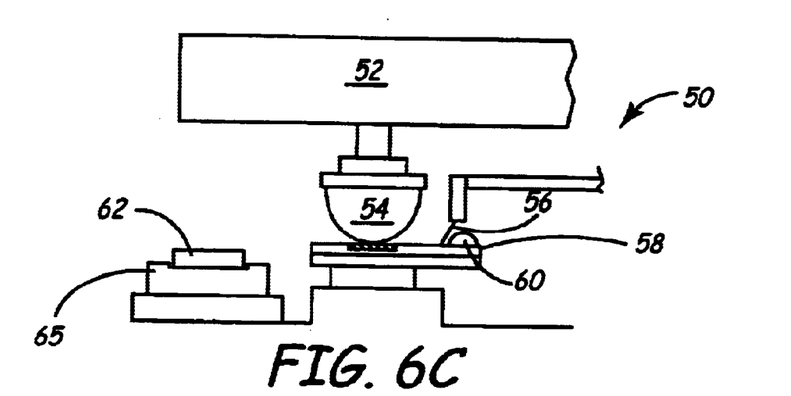

Subsequently, a silicone pad 54 that is moveable along a support arm 52 is brought (S340) into position above the now ink filled recessed portion 59. The size and the shape of the silicone pad 54 are chosen based on the size and the shape of the workpiece 62. The silicone pad 54 is forced (S350) downwards against the ink 64. The characteristics of the chosen ink allow some degree of evaporation along the exposed upper surface of the ink. This causes the ink to become somewhat tacky and the ink adheres to the silicone pad 54 on contact. The depth of the ink deposit 64 is chosen so that the entire ink deposit 64 is lifted and transferred. That is, the ink deposit 64 remains intact and is not split or divided. However, because of the nature of the silicone pad including its resiliency and compressibility, the patterning generated by the recessed portion 59 is retained with the ink 64 transferred to the silicone pad 54.

Figure 6D:
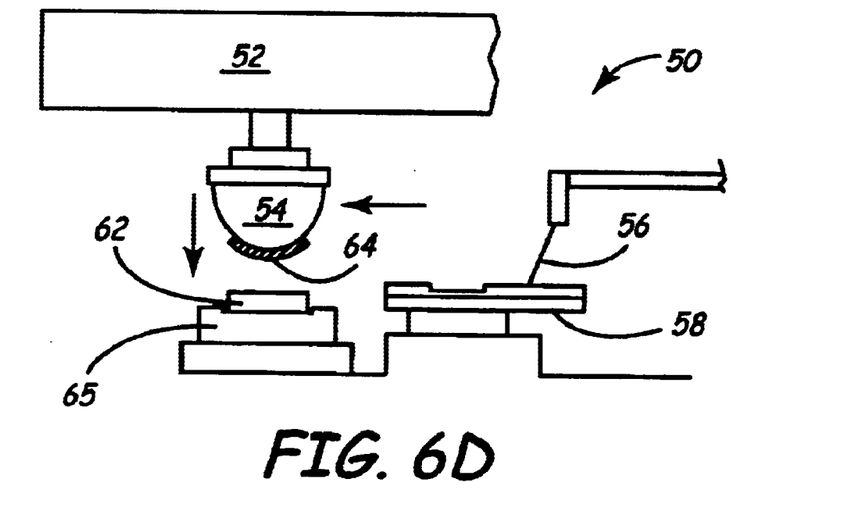

The silicone pad 54 along with the ink deposit 64 attached thereto is moved (S360) along the support arm 52 until the silicone pad 54 is positioned above the workpiece 62 as illustrated in FIG. 6D. As this occurs, the lowermost exposed portion of the ink deposit 64 begins to evaporate, thus causing the ink deposit 64 to become tacky.

Figure 6E:
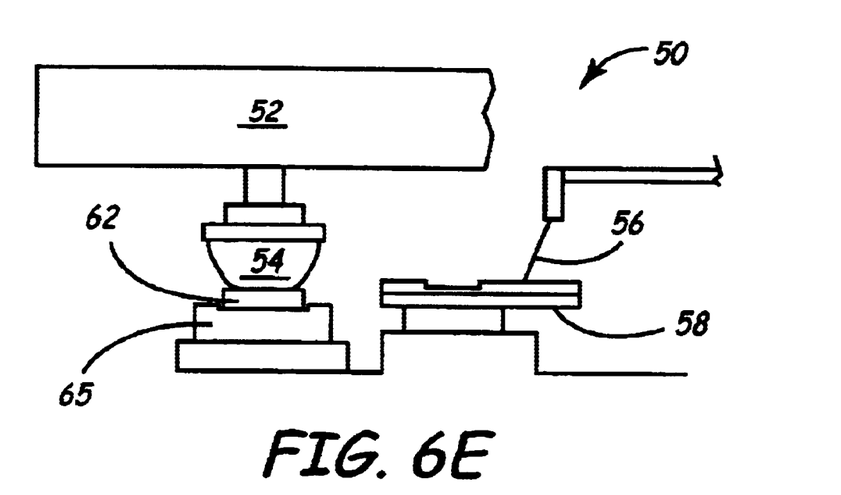

As illustrated in FIG. 6E, the silicone pad 54 is then lowered and forced (S370) against the workpiece 62. The now tacky ink deposit 64 adheres to the workpiece 62 and this adhesion is stronger than that developed between the ink deposit 64 and the silicone. Thus, the ink deposit 64 is transferred to the workpiece 62 and the silicon pad 54 is lifted cleanly away. This process is repeated for each workpiece 62 that is to be printed. In addition, each workpiece may be printed in this manner a plurality of times. For example, multiple printing passes can be made to achieve a multi-color image, to produce deeper and richer colors through layering, to provide a clear coat layer to product the final printed area, or to achieve other printing objectives. Drying or other post-transfer steps (e.g., buffing, polishing, etc.) can be accomplished after or between printing.

Figure 7:
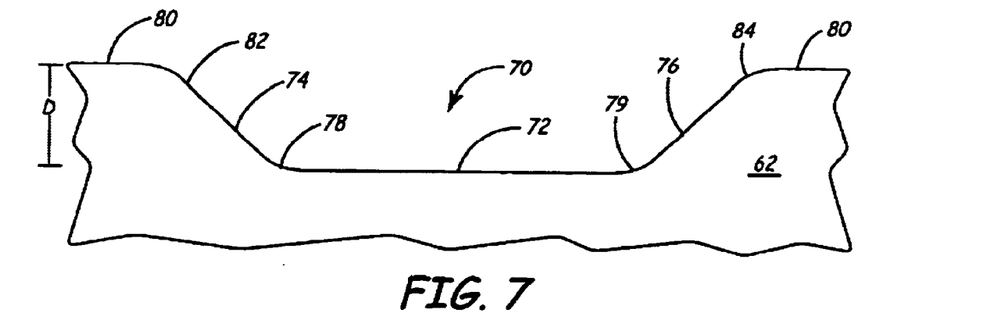
FIG. 7 is a sectional view of a recessed area to be printed.
Figure 8:
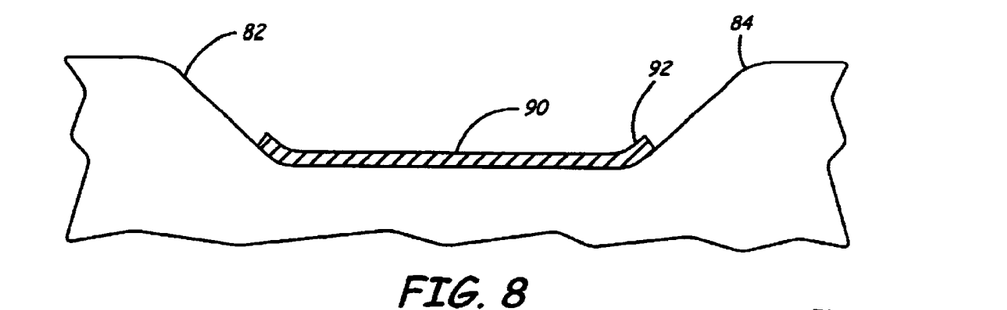
FIGS. 8–9 illustrate the recessed area of FIG. 7 with various ink layers printed thereon.
Figure 9:
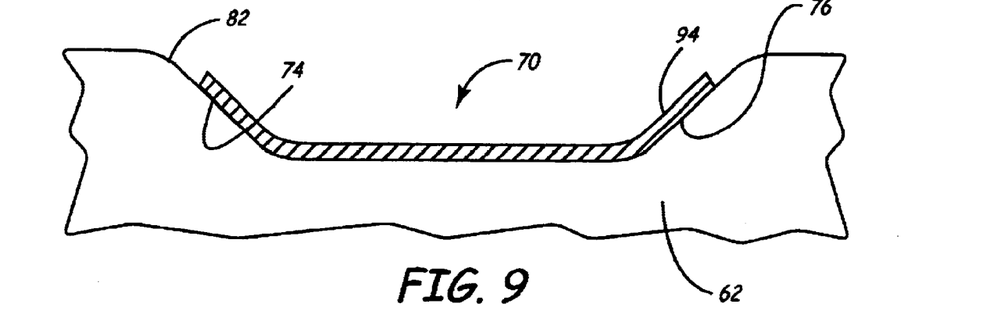

FIGS. 7–9 illustrate a portion of the workpiece 62 including a recess 70 that is specifically configured to allow the pad printing process described above to produce an image in a precise location within a relatively small feature area. That is, the workpiece 62 includes a boundary surface or workpiece surface 80 that can take on almost any shape or contour, but is outside the area to be printed and is often at least partially elevated with respect to the recessed area 70. A planar recess floor 72 defines the primary printing area. The floor 72 could also be non-planar so long as the surface is printable. First sidewall 74 and second sidewall 76-A transition between the recess floor 70 and the workpiece surface 80. The sidewalls 74, 76 may be generally linear along a portion of their span, but are non-orthogonal with respect to the recess floor 72. That is sidewalls 74, 76 may have a linear component or may be defined entirely by arcuate segments. As used herein, a sidewall may be defined by an angle between the sidewall and the floor of the recess. By convention, this angle may be measured from a plane orthogonal to the floor of the recess to the sidewall (when viewed in cross-section). That angle will be measured with respect to a linear portion of the sidewall, if such a linear portion exists. If no such linear portion exists (in cross-section) then the angle is measured with respect to a plane defined by a tangent to a central point of the sidewall. Alternatively, the plane may be defined as a linear average of the arcuate sidewall.

The recess floor 72 is spaced some distance D from the workpiece surface 80 adjacent to the sidewalls 74, 76. This distance D is variable, but must be chosen to facilitate pad printing. With a depth of zero, pad printing can occur; however, this simply produces printing on a flat surface. If the depth is too deep (assuming a relatively narrowly defined recess), the silicone pad 54 will be unable to reach some or all of the recess floor 72. Thus, to achieve optimal pad printing results, the depth D should be between about 0.0005 inches and about 0.050 inches. In one embodiment, pad printing on various emblems occurs when depth D is between 0.010 inches and 0.030 inches. In another embodiment, the depth D is 0.001 inches.

The transition between the recess floor 72 and the sidewalls 74, 76 occurs at the floor/sidewall transitions 78, 79. The floor/sidewall transitions 78, 79 are not sharp angles, but rather are arcuate corners having particular curvatures to facilitate the pad printing process. The floor/sidewall transitions 78,79 not only form the transition between the floor 72 and the sidewalls 74, 76 but also may be used to define the angle of the sidewalls 74, 76 with respect to the floor 72, though this angle can be independently chosen as well.

Figure 10A:
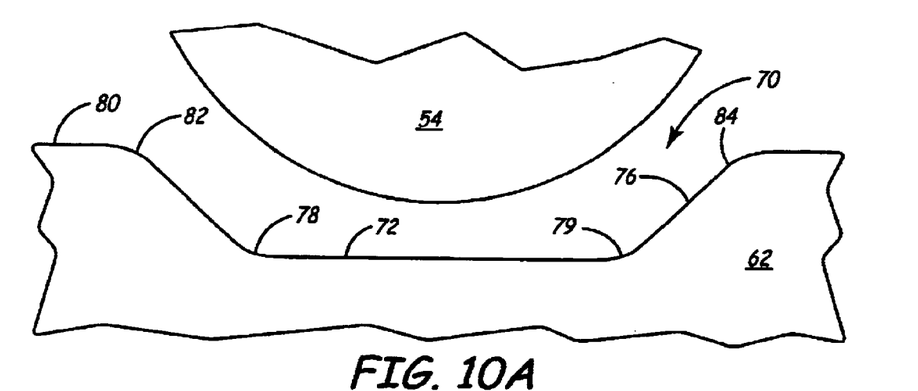
FIGS. 10A–10C are schematic views illustrating the process of printing within a recessed area with a silicone transfer pad.
Figure 10B:
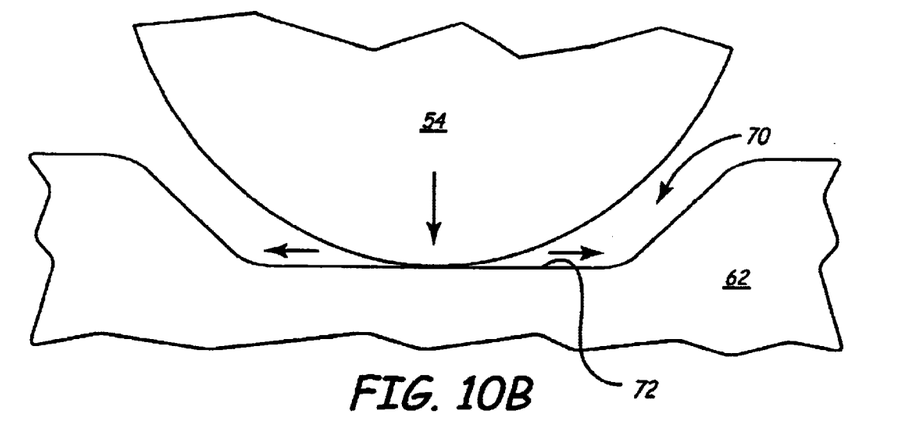
Figure 10C:
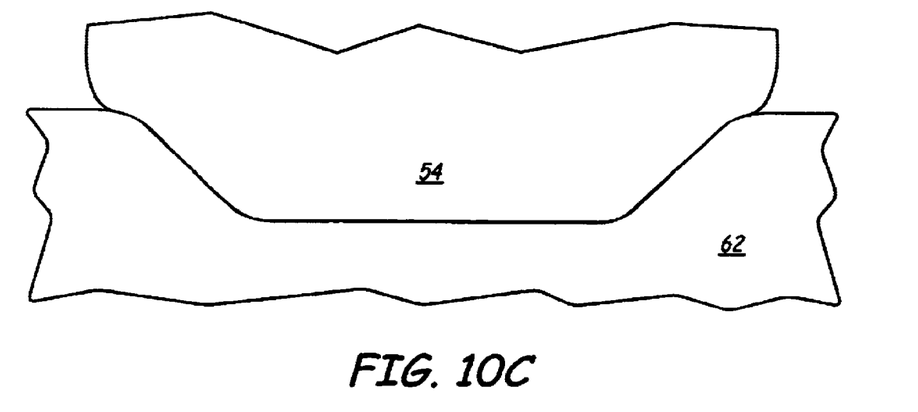

The particular radius of curvature for the floor/sidewall transitions 78,79 is selected to facilitate the pad printing process. Referring to FIGS. 10A–10B, silicone pad 54 is illustrated as it approaches recess 70, contacts floor 72, and spreads out across floor 72. In general, the silicone pad 54 will first contact a central portion of the floor 72, a function that is facilitated by appropriately selecting the depth D as well as the shape of the pad 54 and its durometer. As the silicone pad 54 is compressed, it moves outwardly from the center or point of first contact towards the sidewalls 74, 76. If the sidewalls 74, 76 were orthogonal to the floor 72, a portion of the silicone pad 54 would abut the sidewall before the silicone pad had completely covered and printed the recess floor. This would trap air between a portion of the workpiece 62 and the silicone pad 54. This air gap or pocket would hinder or prevent the transfer of ink where the air gap is defined and could aversely affect the configuration of the silicone that does make contact with the workpiece 62 in those areas adjacent to the air gap.

Thus, by selecting the radius of curvature for the floor/sidewall transitions 78,79, the appropriate pad shape and durometer and the sidewall angles (with respect to the floor 72), the silicone pad 54 is allowed to smoothly imprint the entire floor 72 and even some or all of the sidewalls 74, 76. If the floor/sidewall transitions 78,79 are incorrectly selected, air gaps will result and the pad printing process will be precluded or rendered less effective because the printed areas will be ragged and inconsistent.

As illustrated in FIGS. 7–9, the floor/sidewall transitions 78,79 are formed by an arc, which is a circle segment that can be defined by a radius. To achieve optimal pad printing, the floor/sidewall transitions 78,79 should be have a radius between about 0.003 inches and about 0.60 inches. In one embodiment, the radius of the floor/sidewall transition is 0.015 inches. In addition, the angle of the sidewalls 74, 76 with respect to the floor 72 can be set independently and should be between 0 degrees (perpendicular) and about 85 degrees. In one embodiment, the angle of the sidewalls is between about 50 degrees and about 85 degrees.

The transition between the sidewalls 74, 76 and workpiece surface 80 is referred to as a rounded corner 82, 84. The rounded corners 82,84 serve to help visually highlight and define the printed areas. As explained above, the rounded corners 82, 84 remain free from ink and may be highly reflective. Thus, when viewed from most angles, the rounded corners 82, 84 will reflect light along a linear section. As illustrated in FIGS. 8 and 9, the applied ink layer 90 can be spaced further from rounded corners 82, 84 (FIG. 8), can approach the rounded corner 82, 84, or may even print on the rounded corners 82, 84 and the workpiece surface 80 as the pad printing process will facilitate these approaches. However, in the illustrated embodiments the rounded corners 82, 84 remain free from ink. Some material chosen for workpiece 62 will allow the non-linked portions to be electroplated with chrome, or other reflective or decorative materials to enhance the visual presentation.

To achieve the desired visual effect or produce a visually distinctive, highlighting boundary, the rounded corners 82, 84 may have some degree of curvature that can again be defined by a radius of an arc. The rounded corners 82,84 , may have a radius of between about 0.0005 inches and about 0.6 inches to achieve this affect. In one embodiment, the radius of the rounded corners is between about 0.003 inches and about 0.6 inches. In another embodiment, the radius is 0.005 inches.

Figure 11A:
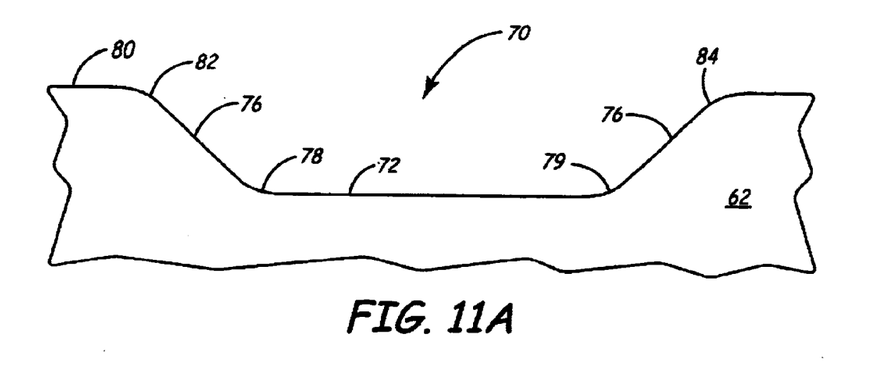
FIGS. 11A–11D are schematic views illustrating a printing process for recessed surfaces that includes providing a base layer beneath the ink layer.
Figure 11B:
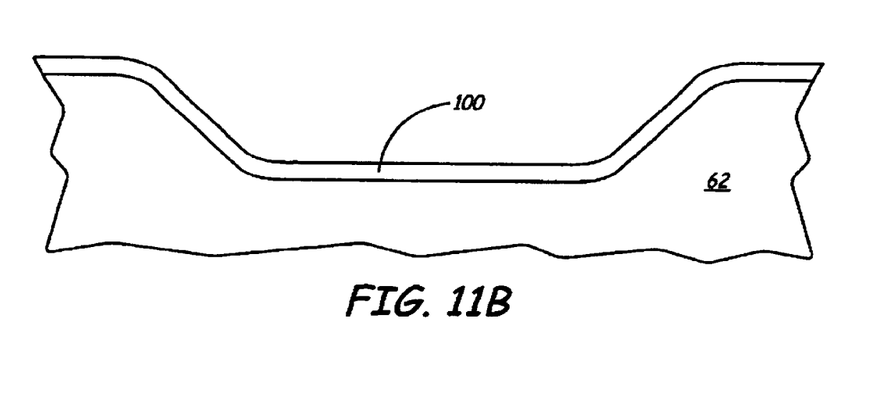
Figure 11C:
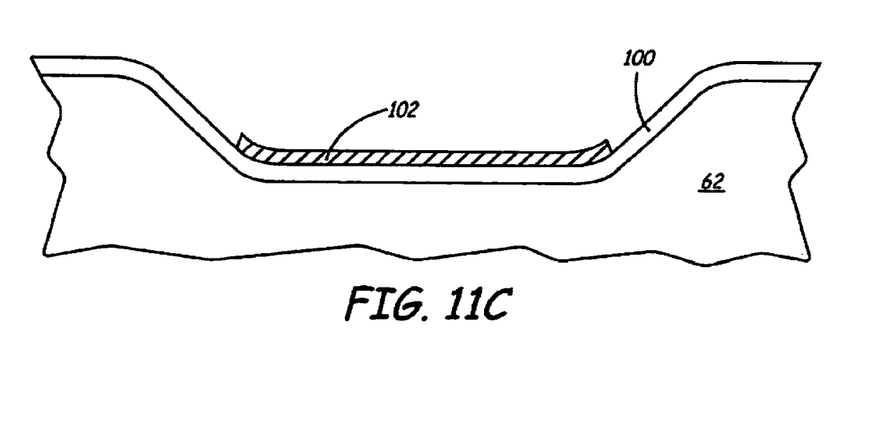
Figure 11D:
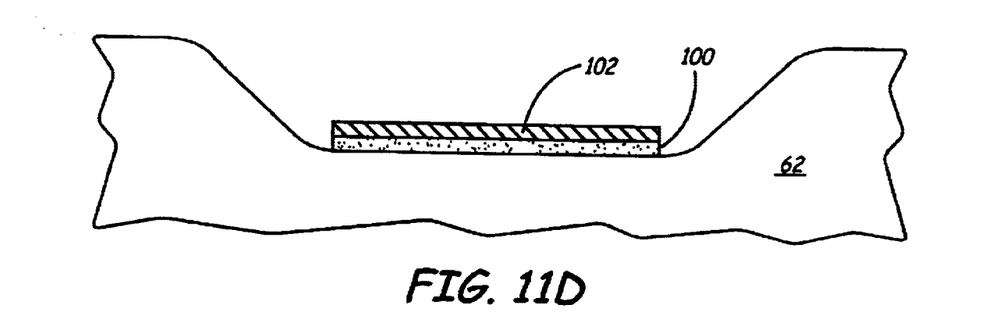
Figure 11E:
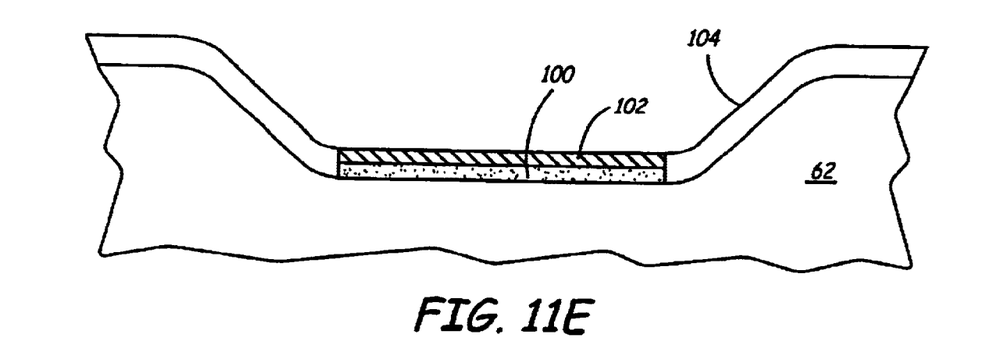

FIGS. 11A–11E illustrate another process that can be used with the pad printing techniques described above for recessed surfaces. The workpiece 62 includes the recess 70, as previously defined. A layer of black chrome 100 (or a similar material) is deposited or electroplated across the exposed upper surface of workpiece 62. In some applications, the black chrome 100 can provide a base coat for paint and printing inks. The pad printing process described above is then utilized to apply an ink layer 102 on top of the black chrome 100 within the recess 70. Using known techniques, the exposed black chrome (i.e. that portion not covered by ink layer 102) is removed. This leaves the ink layer 102 over a base of black chrome 100, as illustrated in FIG. 11D. Then, an optional layer of reflective or decorative material such as chrome 104 can be applied by, for example, an electroplating process. The chrome 104 will only adhere to the workpiece and not to the ink layer 102.

Figure 12:
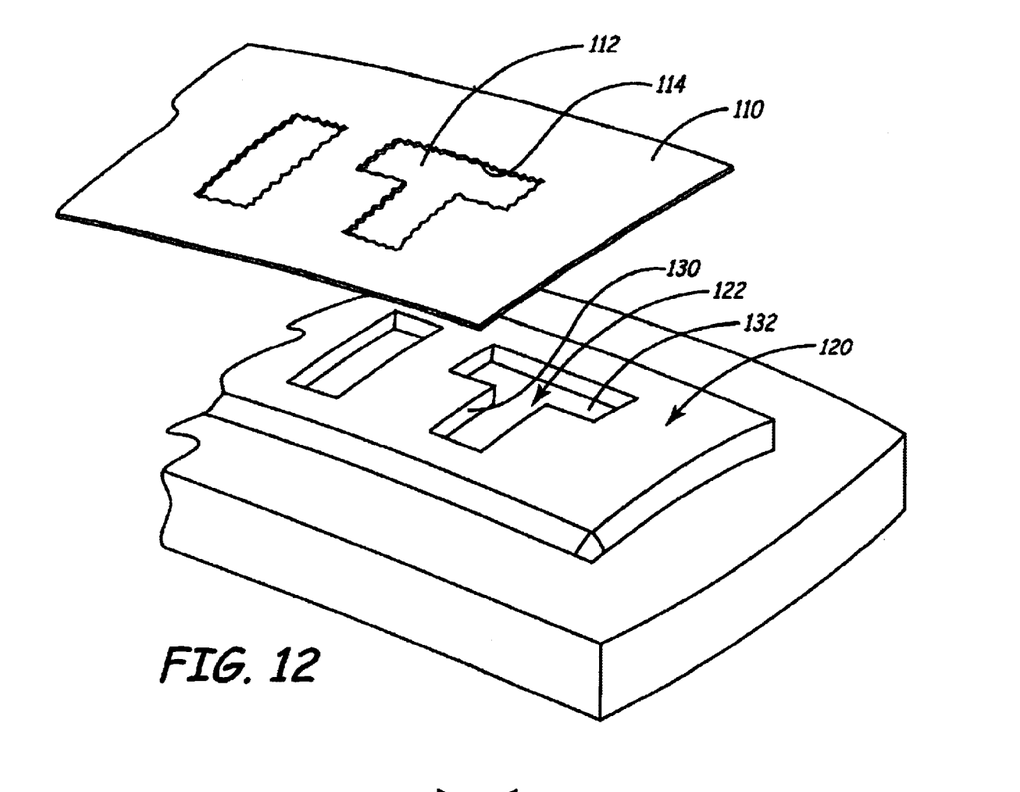
FIG. 12 is an isometric view of a workpiece having a recess with near-vertical sidewalls and a ventilating template.
Figure 13:
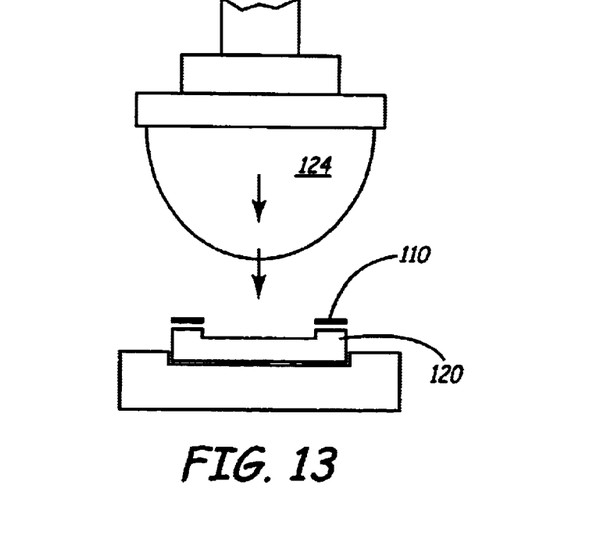
FIG. 13 is a schematic view illustrating the process of printing through the ventilating template with a silicone transfer pad.
Figure 14:
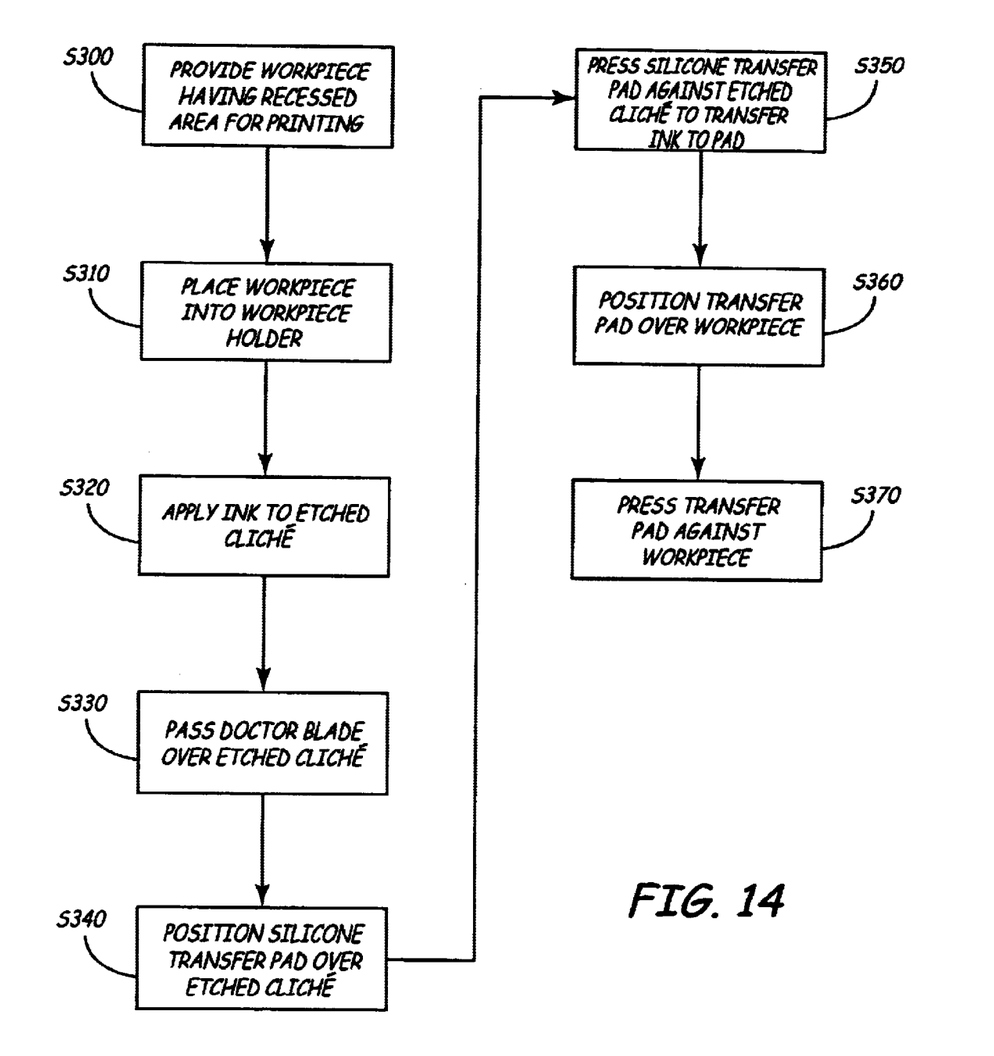
FIG. 14 is a flowchart illustrating the pad printing process.

FIGS. 12 and 13 illustrate a process to provide pad printing on a workpiece 120 that has a recess 122 with near-vertical sidewalls 130. That is, sidewalls 130 are generally perpendicular to the recess floor 132. In general, the same actual printing process and technique is utilized. As discussed above, the vertical nature of the sidewalls 130 will prevent the silicone pad 124 from uniformly reaching the recess floor 132 before trapping air to form a pocket or gap that prevents pad and ink contact with the surface to be printed. This prevents uniform wetting of the surface and hinders the application of the ink to the floor 132, resulting in ragged printing.

A venting template 110 can be inserted between the workpiece 120 and the silicone pad 124. The template 110 has indicia opening 112 that generally correspond to the recesses 122; however, the borders are irregular as illustrated. Thus, as the silicone pad is pressed downward, the irregular borders allow the air that would be trapped by the sidewalls 130 to vent. This in turn allows the silicone pad to make better contact with the floor 132 and produce appropriate printing patterns. In practice, the template 110 prevents the pad 124 from acting as a sealing gasket. Thus, air is allowed to escape or vent, thus facilitating the printing process.

The present invention may be embodied in other specific forms without departing from the essential spirit or attributes thereof. It is desired that the embodiments described herein be considered in all respects as illustrative, not restrictive.

What is claimed is:

1. An automotive emblem for attachment to an automobile comprising:
   a first surface configured for attachment to a body of a vehicle;
   a second surface opposite the first surface;
   a boundary surface forming a portion of the second surface;
   a recess within the second surface and bordered by the boundary surface, the recess including;

a generally planar recess floor configured to receive printable ink;

a first sidewall interconnecting the generally planar recess floor and a first portion of the boundary surface, wherein the first sidewall is disposed at a non-orthogonal angle with respect to the generally planar recess floor and the non-orthogonal angle is between about 0 degrees and about 85 degrees as measured from a plane orthogonal to the generally planar recess floor and extending from the generally planar recess floor towards the plane defined by the boundary surface to the first sidewall;

a second sidewall interconnecting the generally planar recess floor and a second portion of the boundary surface, wherein the second sidewall is disposed at a non-orthogonal angle with respect to the generally planar recess floor and the non-orthogonal angle is between about 0 degrees and about 85 degrees as measured from a plane orthogonal to the generally planar recess floor and extending from the generally planar recess floor towards the plane defined by the boundary surface to the second sidewall, wherein the recess has a depth defined between the plane generally defined by the boundary surface and the generally planar recess floor, wherein the depth is between about 0.0005 inches and about 0.050 inches;

a first floor-sidewall transition interconnecting the generally planar recess floor with the first sidewall, wherein the first floor-sidewall transition is an arcuate corner formed by an arc segment having a radius of between about 0.003 inches and about 0.6 inches;

a second floor-sidewall transition interconnecting the generally planar recess floor with the second sidewall, wherein the second floor-sidewall transition is an arcuate corner formed by an arc segment having a radius of between about 0.003 inches and about 0.6 inches;

a first convex rounded corner interconnecting the first sidewall with the first portion of the boundary surface, wherein the first convex rounded corner is formed by an arc segment having a radius of between about 0.003 inches and about 0.6 inches;

a second convex rounded corner interconnecting the second sidewall with the second portion of the boundary surface, wherein the second convex rounded corner is formed by an arc segment having a radius of between about 0.003 inches and about 0.6 inches;

an ink layer disposed on the generally planar recess floor so that substantially the entire generally planar recess floor is covered by the ink layer and the ink layer terminates on a first edge between the first floor-sidewall transition and the first convex rounded corner so that the first convex rounded corner is devoid of ink and on a second edge between the second floor-sidewall transition and the second convex rounded corners so that the second convex rounded corner is devoid of ink, wherein the ink layer is pad printing ink applied during a pad printing process; and a reflective surface forming at least a portion of the boundary surface, the first convex rounded corner and the second convex rounded corner.

2. The emblem of claim 1, wherein the depth is 0.001 inches, the first floor-sidewall transition arc segment is 0.015 inches and the first convex rounded corner arc segment is 0.005 inches.

3. The emblem of claim 2, wherein the second floor-sidewall transition arc segment is 0.015 inches and the second convex rounded corner arc segment is 0.005 inches.

* * * * *